United States Patent
Hurst

(10) Patent No.: US 6,351,887 B1
(45) Date of Patent: Mar. 5, 2002

(54) GRILL KNIFE AND SCRAPER

(76) Inventor: Peter Hurst, 37357 Ave. 12, Madera, CA (US) 93638

( * ) Notice: Subject to any disclaimer, the term of this patent is extended or adjusted under 35 U.S.C. 154(b) by 0 days.

(21) Appl. No.: 09/518,317

(22) Filed: Mar. 3, 2000

(51) Int. Cl.⁷ .............................. A47L 17/06; B26B 3/00
(52) U.S. Cl. ........................ 30/169; 15/236.01; 30/340
(58) Field of Search ........................ 30/169, 286, 294, 30/314, 315, 317, 340, 342, 344; 15/236.01, 236.02; 32/40, 46, 48, 52

(56) References Cited

U.S. PATENT DOCUMENTS

| | | | |
|---|---|---|---|
| D23,068 S | | 2/1894 | Leggett |
| 1,412,728 A | * | 4/1922 | Werner .................... 30/169 |
| 2,747,911 A | * | 5/1956 | Kuever .................... 30/169 |
| 2,914,787 A | | 12/1959 | Hartkopf |
| 3,047,946 A | | 8/1962 | Lins |
| 3,836,119 A | * | 9/1974 | Saucier, Sr. et al. .......... 30/169 |
| 3,865,370 A | | 2/1975 | Rogers |
| 4,495,670 A | * | 1/1985 | Baker .................... 30/169 |
| D285,014 S | | 8/1986 | Maciel |
| 5,386,633 A | * | 2/1995 | Kanno .................... 30/169 |
| 5,485,647 A | * | 1/1996 | Durst .................... 15/236.01 |
| 5,666,732 A | * | 9/1997 | Shea .................... 30/169 |

OTHER PUBLICATIONS

Central Restaurant Products Wholesale Equipment & Supplies 2000, p. 45, 50, 53 and 55.
Prince Castle Inc. Worldwide—2000 Worldwide Price List, p. 14.
Resco Cresco catalog, pp. 44 and 68.
Zesco Products—2000 Wholesale Catalog, pp. 157, 160 and 180.

* cited by examiner

Primary Examiner—Hwei-Slu Payer
(74) Attorney, Agent, or Firm—Richard A. Ryan

(57) ABSTRACT

A grill knife and scraper for cutting food items and scraping clean the surface of a grill having a handle and a blade connected to the handle. The handle is heat resistant to prevent it from becoming too hot when placed on or near the hot grill or other hot surfaces. The proximal end of the handle is smooth for ease of holding the tool in the palms of the hands. The blade protrudes from the generally planar surface at the distal end of the handle. The proximal end of the blade is secured inside and to the handle. The distal end of the blade extends one to three inches from the planar surface and can be shaped and configured to be tapered so as to provide a more effective cutting and scraping edge.

16 Claims, 3 Drawing Sheets

GRILL KNIFE AND SCRAPER

BACKGROUND OF THE INVENTION

1. Field of the Invention

The field of the present invention relates generally to scraping and cutting implements. More particularly, the present invention relates to combination scraping and cutting implements for use in restaurants and the like having flat top grills.

2. Background

Most restaurants have one or more flat top grills or griddles that provide a relatively flat, hot cooking surface for cooking hamburgers, eggs, pancakes and many other food items thereon. Spatulas and long handled forks are frequently used to cook the food (i.e., flip it over or move it around) and to place the food on a serving plate. As is well known in the industry, the cooked food items almost always leave behind grease, particles of food and other material on the grill that must be cleaned off the grill prior to use of the grill for the next food item. For instance, grease from cooked food is scraped away to a grease drain. When cooking food, it is often necessary to spread cooking grease, butter or other materials on the grill to coat and lubricate that portion of the grill where the food item is to be cooked.

Current tools for scraping away grease and other materials off a grill include the block scraper, plane scraper and griddle scraper. The block scraper, used by many meat departments and bakeries, comprises a small, generally rectangularly shaped block having a knife edge protruding from one edge. The block portion of the block scraper is typically only one to two inches in depth and the knife portion protrudes approximately three to six inches from one edge of the block. A major problem with use of the block scraper to clean grills is that the user's fingers tend to go over the block and contact the metal knife portion of the block scraper. If the block scraper has been left on the grill, then the metal portion of the block scraper will be very hot and can severely burn that portion of the user's fingers that contact the metal. As such, if the block scraper has been left on or too near the grill, then the user tends not to use the scraper until it has a chance to cool off. In addition, because the metal portion of the block scraper is generally too short, grease or other material tends to easily splash up onto the user's fingers or hand.

The larger plane scraper solves some of the problems described above with the block scraper. The plane scraper is similar to an old fashion wood plane, having a base structure with at least one gripping handle on top and a blade protruding from under the base structure. The user places both hands on the top of the base, one hand on the "handle" in front and the other hand on the back of the plane scraper to apply downward pressure on the plane scraper to scrape away the grease off the grill. While the plane scraper solves the problem with the block scraper of having grease splash up onto the user's hand, the plane scraper does tend get too hot to handle if left on or near the grill.

The griddle scraper is the most commonly used device to scrape grills. In fact, the griddle scraper is the only tool made specifically to scrape flat top grills. This device is similar in shape to a large, elongated putty knife. The griddle scraper is held with only one hand, which limits the amount of force or pressure that can be applied by the user to scrape the grill. Other devices, such as cleaning pads and grill bricks, are also used to clean grills. A rigid hamburger turner is also used to scrape the surface of a grill.

Several scraper devices have been patented, including several for use in cooking or cleaning operations. U.S. Pat. No. 2,914,787 to Hartkopf describes a scraper having a thin handle and replaceable blade. U.S. Pat. No. Des. 23,068 is a scraper design comprising a tubular shaped handle along one side edge of the blade. U.S. Pat. No. Des. 285,04 is a scraper design also having a tubular shaped handle at one side edge and along one end of a blade with grooves cut into the side edge tubular structure. All three of these devices suffer from the same disadvantages discussed above for the block scraper.

Although the above-described patents, as well as other related devices, describe various scraping implements, none of the prior art devices known to the inventor describe, singularly or in combination, a simple to make and use grill knife and scraper that does not rapidly acquire heat and does not adequately protect the user from grease and other materials splashing up on the user's fingers or hand. Consequently, a need exists for a grill knife and scraper that is relatively inexpensive to manufacture and easy to use, yet which provides a device that does not rapidly become too hot for use and which helps prevent splashing injuries to the user.

SUMMARY OF THE INVENTION

The grill knife and scraper of the present invention provides the benefits and helps solve the problems identified above. That is to say, the present invention provides a combination grill knife and scraper that is inexpensive to manufacture, easy to use, does not rapidly become too hot to handle and which helps prevent or minimize splashing of grease and other material onto the user of the device.

The grill knife and scraper of the present invention comprises a handle portion, a blade portion and a mechanism for connecting the blade to the handle. Unlike the prior scraper devices, the handle of the present invention has a much longer handle length, as measured from the proximal end to the distal end (the proximal end being that end held by the user and the distal end being the end nearest the blade). The longer handle length eliminates or reduces the likelihood of grease or other materials splashing up on the user's hand while the scraper is being used to scrape the grill surface. The handle of the present invention should be made out of a material that is relatively heat resistant so that the grill knife and scraper can be left on the grill surface for short periods of time without becoming too hot to hold. Materials such as wood, ceramic and various other composite materials have the desired heat resistant properties. The width of the handle, the distance from one outer edge to the other across the handle, should be sufficient for the user to place both hands on the handle when scraping the grill surface. The thickness of the handle, including the portion of the blade in the handle, should be such that it can comfortably fit into the palm of the user's hand and provide sufficient thickness to enable the user to push downward while scraping without buckling the handle.

The blade of the present invention can be made out of a variety of metals, such as stainless steel, or other materials that provide the benefits described herein. The metal blade should be sufficiently strong to avoid buckling while scraping, adaptable to having a relatively sharp edge, and suitable for cleaning or sterilizing as necessary. The blade length, measured from the proximal end inside the handle to the distal end having an outer edge that scrapes, should be sufficient to securely anchor the blade inside the handle and provide a knife-like extension from the handle. The blade can be anchored inside the handle with cutlery rivets, screws, bolts or an adhesive. The blade should extend from the handle approximately two to three inches to provide a cutting tool without resulting in buckling. The blade to handle interface can be sealed to prevent food materials from getting between the blade and the handle, inside the handle, which can result in contamination problems.

The grill knife and scrape of the present invention can be provided in several different sizes, having a variety of widths and blade lengths without affecting the scope of the present invention. The width can vary depending on the amount of grill surface to clean in a single pass and the width of a person's hands. The blade length can vary depending on the type of cutting action (i.e., how deep the food to be cut) for which the device will be used.

In use, the person using the grill knife and scraper of the present invention to scrape off the top of a grill will grab the device in the palm of his or her hands and apply a generally downward force against the device on the grill and slide it along the top surface of the grill to scrape off its surface. Because the handle is wide enough for two hands, sufficient effective force can be applied to clean off even stubborn material stuck to the grill surface. To use the device as a cutting tool or knife, the user merely turns the blade in a generally downward direction to slice through the food or other material desired to be cut. Because the handle of the device is made out of generally heat resistant material and the blade is disposed far enough away from the proximal end of the handle, the device can be left on the surface of the grill while the user does something else and then picked back up without burning the user's fingers or hand.

Accordingly, the primary objective of the present invention is to provide a grill knife and scraper which can be inexpensively made and easily utilized as a cutting and scraping tool for use with the preparation of food and cleaning of a grill surface.

It is also an important objective of the present invention to provide a grill knife and scraper having a handle made out of heat resistant materials and having a sufficient length to prevent or minimize the likelihood of burning the user's fingers or hand if the device is left on or near the grill or other hot surface.

It is also an important objective of the present invention to provide a grill knife and scraper having a handle of sufficient length to help prevent or minimize splashing of grease or food onto the user of the present invention during scraping operation.

It is also an important objective of the present invention to provide a grill knife and scraper that has a blade portion that extends a sufficient distance from the handle to utilize the device as a cutting tool and to provide an effective scraping tool.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
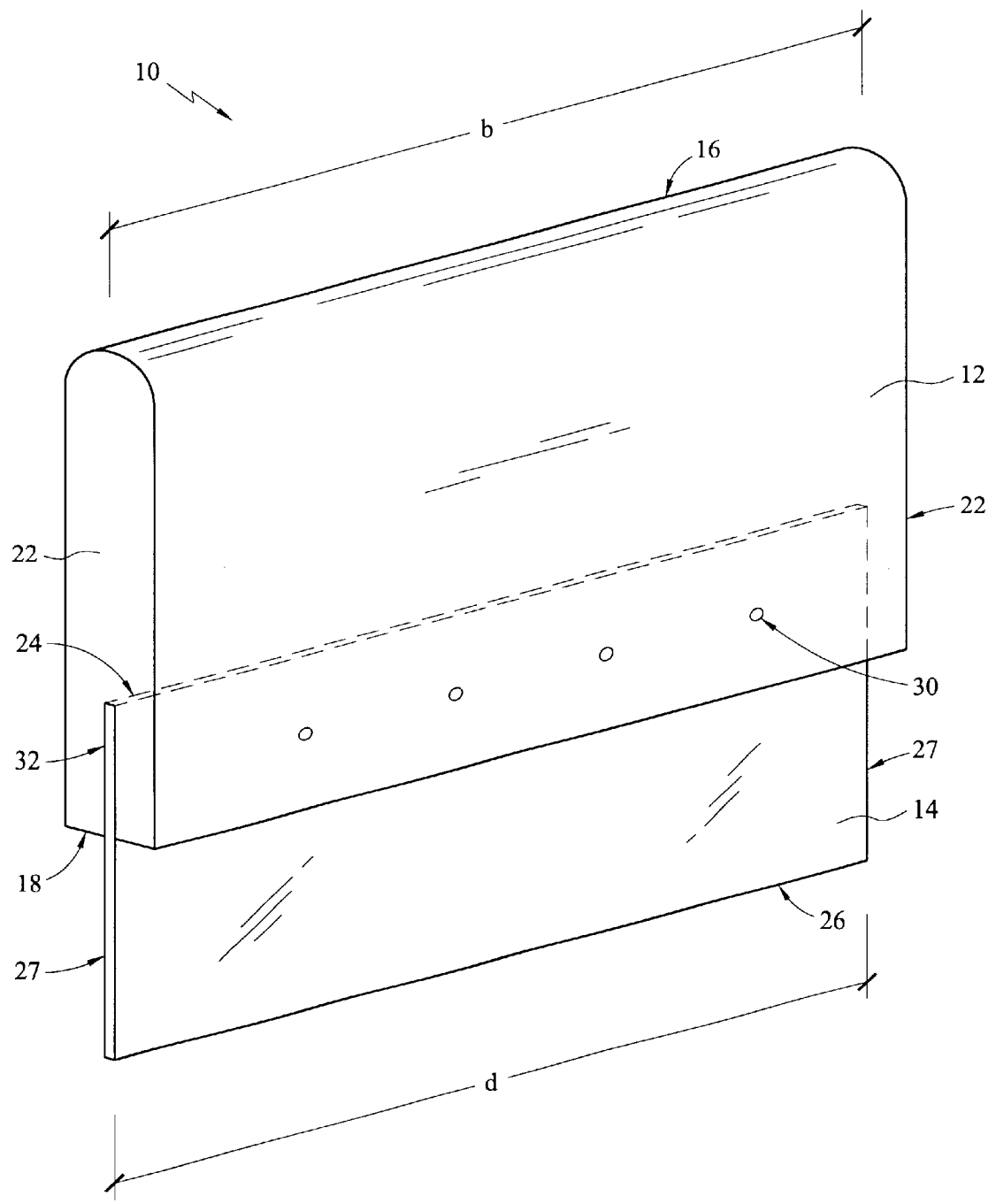
FIG. 1 is a perspective view of the grill knife and scraper of the present invention.

With reference to FIGS. 1 through 5 where like elements have been given like numerical designations to facilitate the reader's understanding of the present invention, the preferred embodiment of the present invention is set forth below. The grill knife and scraper tool, designated generally as 10, is configured to fit within the hand or hands of a person to enable that person to easily and effectively utilize the present tool 10 to cut food products and clean the surface of grill. As best shown in FIG. 1, tool 10 comprises a handle 12 and blade 14 extending outwardly from handle 12. The proximal end 16 of handle 12 is shaped and configured to have a generally smooth curved surface to fit comfortably within the palm of the user's hands. In the preferred embodiment of the present invention 10, the distal end 18 of handle 12 is a generally planar surface 20, best shown in FIG. 4 as having thickness "a", of approximately three fourths of an inch to one and a half inches. The planar surface 20 of distal end 18 provides a splash guard effect when the user is using the tool 10 to scrape the surface of a grill.

The width "b" of handle 12 (shown in FIG. 1), as measured from opposing sides 22, should be sufficient for the user to place both of his or her hands on handle 12 in order to provide sufficient force, when necessary, to effectively scrape off the surface of the grill. Generally, a width "b" of approximately five to eight inches will provide sufficient width for holding tool 10 with both hands. If desired, the handle 12 of tool 10 can be made smaller for single hand gripping. Handle 12 should not be made so wide as to be difficult to use (i.e., due to the limited space on the grill surface) so as to interfere with using a portion of the grill while scraping another portion. Sides 22 can be generally planar, as shown in FIG. 1.

The length "c" of handle 14 should be sufficient to help prevent the user from burning his or her fingers or hands on the grill when utilizing tool 10 as a scraper. The prior art devices were generally insufficient in this regard. When pushing tool 10 across a hot grill, it is necessary for the user to keep his or her fingers and hand off the grill. In addition, it is also necessary that the handle 12 be of sufficient length to help prevent splashing of hot grease or other foods onto the hand. The inventor has found that handle 12 lengths of four to six inches are generally sufficient to avoid burning fingers or hands on the hot grill and to minimize splashing injuries.

In the preferred embodiment, handle 12 is made out of a material that is generally heat resistant so that tool 10 may be left on or near the grill or other hot surfaces for at least short periods of time without becoming too hot to hold. In addition, the handle should be adaptable for cleaning and sterilizing, if necessary, utilizing generally available cleaning facilities found in most restaurants, bakeries and other places where cooking is done, such as being dipped in sanitizing solution. The inventor has found that wood works well for handle 12. Wood tends to be heat resistant and can be held in the hand even after being left on the grill for short periods of time. In addition, wood is easy to clean and resists breakage in case the tool 10 is dropped. Preferably, for strength purposes, the wood grain should run between the proximal 16 and distal 18 ends of handle 12. Other materials, such as ceramic, fiberglass and certain composites, can provide the same heat resistant, non-fragile benefits of wood that are desired for handle 12.

Figure 2:
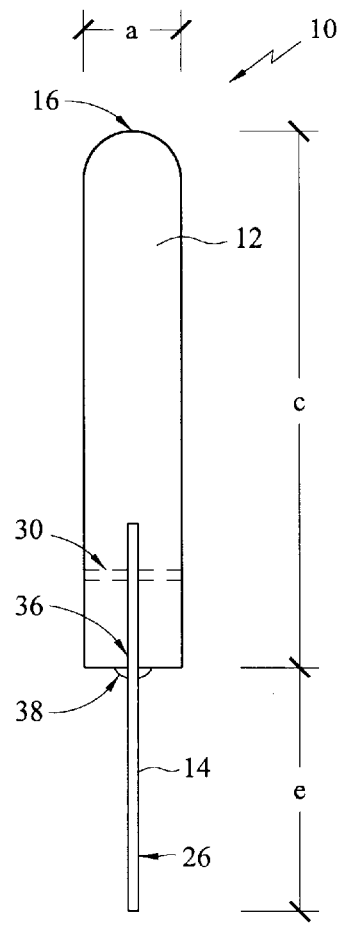
FIG. 2 is a side view of the present invention, the other end view being the same.
Figure 3:
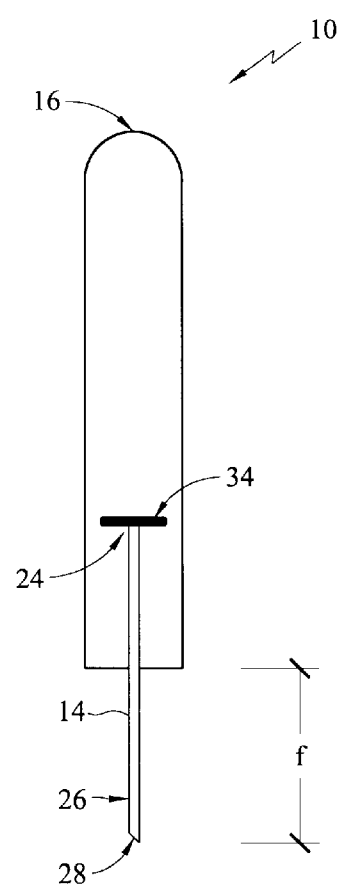
FIG. 3 is a side view of the present invention showing the use of a shorter blade and an alternative connection mechanism, the other end view being the same.
Figure 4:
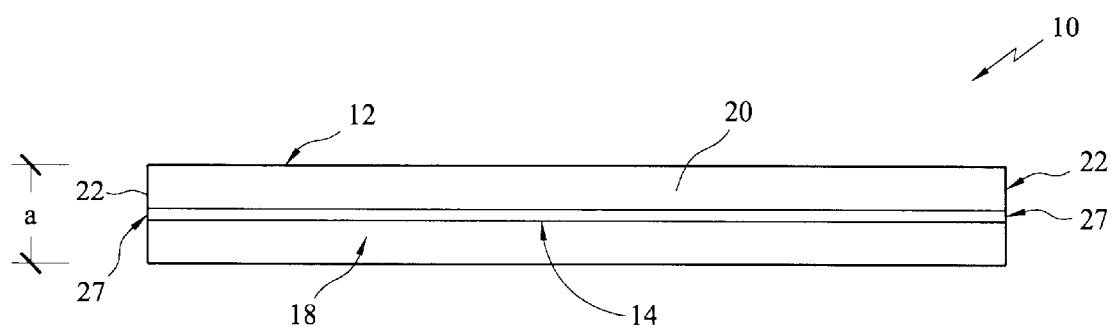
FIG. 4 is a bottom view from of the present invention.

As shown in FIGS. 1 through 3 and 5, blade 14 protrudes from handle 12 to provide the knife and scraper functions of tool 10. In the preferred embodiment, blade 14 is a relatively thin piece of hardened stainless steel, such as 18 gauge to 32 gauge stainless steel, that has a proximal end 24, distal end 26 and opposing sides 27. Other materials can be used for blade 14 that also provide a strong, substantially inflexible blade for cutting food products and scraping clean the surface of a grill. The material chosen for blade 14 should also be adaptable for cleaning and sterilizing, if necessary, to remove food items, grease and other materials that may contaminate blade 14. In the preferred embodiment, the width "d" of blade 14, as shown in FIG. 1 between opposing sides 27, is substantially equal to the width "b" of handle 12. Alternatively, the width "d" of blade 14 can also be less than width "b" of handle 12, however, for safety reasons, blade 14 should not extend past sides 22 of handle 12. As shown in FIGS. 3 and 4, blade 14 can protrude from handle 12 a variety of distances (i.e., distances "e" and "f"). The distance which blade 14 extends should be sufficient to provide effective cutting and scraping, but not so far that blade 14 becomes unstable and have insufficient stiffness to cut and/or scrape as desired. The inventor has found that tool 10 having blade 14 extending one to three inches from distal end 18 of handle 12 is generally sufficient to provide the cutting and scraping capabilities desired for tool 10 and not result in flexing problems with blade 14 when cutting or scraping.

Distal end 26 can be sharpened, if desired, to provide a more effective knife and scraper tool. In the preferred embodiment, shown in FIG. 3, distal end 26 of blade 14 is flat across its end, providing tool 10 with two sharp edges for scraping the surface of a grill. If necessary, a sharpening tool or device can be used across the flat end to sharpen the two edges. Alternatively, distal end 26 can be shaped and configured to comprise a tapered end 28 to provide a more effective cutting tool. Proximal end 24 extends into and is secured by handle 12.

In the preferred embodiment, blade 14 is inserted into a groove or other opening cut into the distal end 18 of handle 12. In an alternative embodiment, handle 12 can be divided into two pieces and blade 14 secured inside those two pieces when handle 12 is rejoined.

Figure 5:
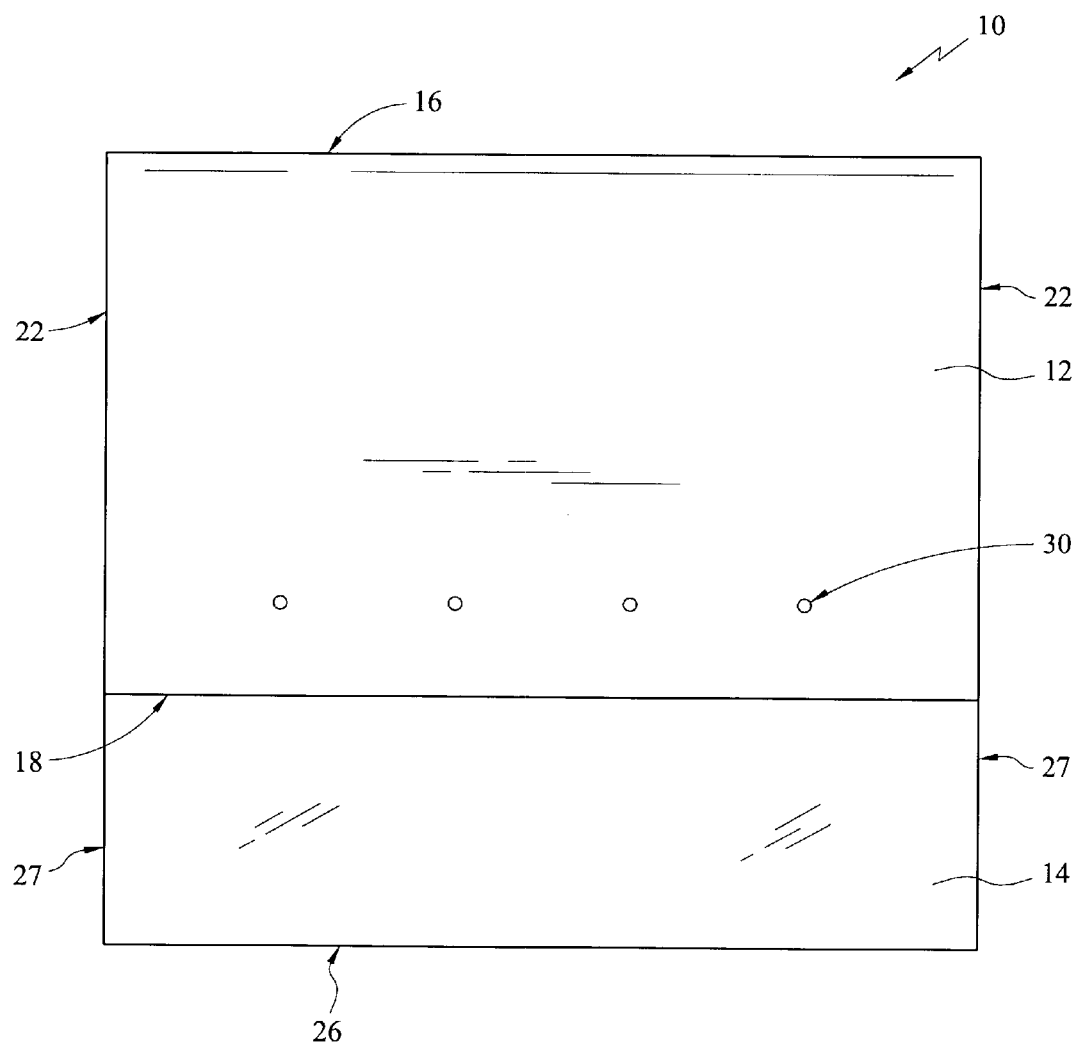
FIG. 5 is a front view of the present invention, the back view being the same.

As shown in FIGS. 1, 2 and 5, one or more cutlery rivets 30 can be used to securely fasten blade 14 in handle 12.

Screws, bolts or other fasteners can be used instead of or in conjunction with cutlery rivets 30 to securely attach or connect blade 14 to handle 12. As shown in FIG. 2, the connector 30 can go entirely through handle 12. Alternatively, connector 30 can just connect to one side of blade 14 in handle 12. Instead of connectors, the tool 10 of the present invention can utilize an adhesive, shown as 32 in FIG. 1, to secure blade 14 in handle 12. Adhesive 32 can be used in conjunction with the connectors 30 described above. As an alternative to either the connectors 30 or adhesive 32, tool 10 can utilize a mechanical connection, shown as 34 in FIG. 3, between the blade 14 and handle 12. Mechanical connector 34 can comprise a T-shaped, L-shaped or other shaped proximal end 24 of blade 14 that tightly fits into a similarly shaped opening in handle 12 to securely connect blade 14 to handle 12.

In the preferred embodiment, the interface 36 where blade 14 connects to handle 12 is closed or sealed to prevent food, grease and other materials from invading the space between handle 12 and blade 14 inside handle 12. Any such material that gets inside this space can then spoil and contaminate other food products that are cut with the tool 10 or the contaminate the grill itself during scraping operations. Because it would be difficult to remove material that gets stuck in the blade 14 and handle 12 gap, if any, it is necessary to prevent such material from entering the gap. In the preferred embodiment, blade 14 is tightly inserted in a groove or opening cut into handle 12 such that there is no gap between handle 12 and blade 14. If there is a gap, then sealing material 38 can be applied to the interface 36 to accomplish the objective of preventing food or grease from entering the gap area. The sealing material 38 can be a caulking material, glue or other adhesive, plastic layer, solder or other like materials that are sufficient for preventing the entry of food and other materials into any space between handle 12 and blade 14.

In use for scraping, the user of tool 10 grasps handle 12 in the palms of his or her hands and faces tool 10 in a generally downward direction against the surface of the grill.

The user applies sufficient force to scrape any material off of the grill with the distal end 26 of blade 14. The length "c" of tool 10 and the thickness "a" of planar surface 20 should be sufficient to prevent any hot food materials and/or grease from splashing onto the user's fingers or hands. For cutting use, the user can use one or both hands to grasp handle 12 and push blade 14 in a downward direction to cut through or into the desired food item. A sharpened distal end 26 of blade 14, such as tapered end 28, can assist with this purpose.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A grill knife and scraper, comprising:

a handle having a proximal end, a distal end and a pair of opposing sides forming a handle width, said proximal end of said handle shaped and configured to be generally smooth, said distal end of said handle having a substantially planar surface, said handle made from a heat resistant material;

a blade having a proximal end, a distal end and a pair of opposing sides forming a blade width, said proximal end of said blade disposed in said handle, said distal end of said blade protruding from said distal end of said handle, said blade width equal to or less than said handle width;

securing means for securing said handle to said blade; and sealing means at the interface of said blade and said handle for sealing said blade in said handle.

2. The grill knife and scraper according to claim 1, wherein said handle has a handle length of four to six inches.

3. The grill knife and scraper according to claim 2, wherein said handle width is five to eight inches.

4. The grill knife and scraper according to claim 1, wherein said handle width is five to eight inches.

5. The grill knife and scraper according to claim 1, wherein said blade protrudes one to three inches from said planar surface of said handle.

6. A grill knife and scraper, comprising:
- a handle having a proximal end, a distal end and a pair of opposing sides forming a handle width;
- a blade having a proximal end, a distal end and a pair of opposing sides forming a blade width, said proximal end of said blade disposed in said handle, said distal end of said blade protruding from said distal end of said handle, said blade width equal to or less than said handle width;
- securing means for securing said handle to said blade; and
- sealing means at the interface of said blade and said handle for sealing said blade in said handle.

7. The grill knife and scraper according to claim 6, wherein said handle has a handle length of four to six inches.

8. The grill knife and scraper according to claim 6, wherein said handle is made from a heat resistant material.

9. The grill knife and scraper according to claim 6, wherein said blade protrudes one to three inches from said distal end of said handle.

10. The grill knife and scraper according to claim 6, wherein said proximal end of said handle is shaped and configured to be generally smooth.

11. The grill knife and scraper according to claim 6, wherein said distal end of said handle has a substantially planar surface.

12. The grill knife and scraper according to claim 6, wherein said handle width is five to eight inches.

13. The grill knife and scraper according to claim 6, wherein said distal end of said blade is shaped and configured to provide a tapered cutting edge.

14. The grill knife and scraper according to claim 6, wherein said securing means comprises one or more connectors.

15. The grill knife and scraper according to claim 6, wherein said securing means comprises an adhesive.

16. The grill knife and scraper according to claim 6, wherein said securing means comprises a mechanical adaptation to said proximal end of said blade, said mechanical adaptation configured to interact with said handle.

* * * * *